US011524646B2

(12) United States Patent
Kotake

(10) Patent No.: US 11,524,646 B2
(45) Date of Patent: Dec. 13, 2022

(54) VEHICLE

(71) Applicants: TOYOTA JIDOSHA KABUSHIKI KAISHA, Toyota (JP); SUBARU CORPORATION, Tokyo (JP)

(72) Inventor: Shota Kotake, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/393,516

(22) Filed: Aug. 4, 2021

(65) Prior Publication Data

US 2022/0063532 A1 Mar. 3, 2022

(30) Foreign Application Priority Data

Aug. 31, 2020 (JP) ............................ JP2020-145713

(51) Int. Cl.

| | |
|---|---|
| ***B60R 19/24*** | (2006.01) |
| ***B62D 27/02*** | (2006.01) |
| ***B62D 25/18*** | (2006.01) |
| *B60R 19/18* | (2006.01) |

(52) U.S. Cl.

CPC .............. *B60R 19/24* (2013.01); *B62D 25/18* (2013.01); *B62D 27/023* (2013.01); *B60R 2019/1886* (2013.01); *B60R 2019/247* (2013.01)

(58) Field of Classification Search

CPC . B60R 19/23; B60R 19/03; B60R 2019/1886; B60R 2019/247; B60R 19/24

USPC .................. 296/198; 293/102, 120, 154, 155

See application file for complete search history.

(56) References Cited

U.S. PATENT DOCUMENTS

2019/0322232 A1 10/2019 Yagame

FOREIGN PATENT DOCUMENTS

| | | | | |
|---|---|---|---|---|
| CN | 104136280 B | * | 8/2016 | ............ B60R 19/24 |
| JP | H10-029478 A | | 2/1998 | |
| JP | 2015-147449 A | | 8/2015 | |
| JP | 6414741 B2 | * | 10/2018 | |
| JP | 2019-188961 A | | 10/2019 | |
| JP | 2020083108 A | * | 6/2020 | |

* cited by examiner

*Primary Examiner* — Dennis H Pedder

(74) *Attorney, Agent, or Firm* — Oliff PLC

(57) ABSTRACT

A vehicle may include: an external fender covering a front fender panel; a bumper; and a retainer fixing the external fender and the bumper to the front fender panel, in which the external fender includes an external fender end, the bumper includes a bumper end, and the external fender end and the bumper end are disposed in vicinity to and face each other, the retainer is disposed near a boundary between the external fender end and the bumper end, the retainer is covered by the external fender and the bumper, the external fender end includes an external fender flange protruding inward of the vehicle, the bumper end includes a bumper flange protruding inward of the vehicle, the retainer includes a groove extending along the boundary between the external fender end and the bumper end, and the external fender flange and the bumper flange are inserted in the groove.

12 Claims, 5 Drawing Sheets

Left
Up
Front
20
22
21
21
20E
20F
49
44
41
W1
40T
W2
40S1
46
44
41
44
44
43
45
42
45
42
48
48
Y1
40S2
45
47
43
44
45
Y2
40
31
30E
30F
30
32
31

VEHICLE

CROSS-REFERENCE TO RELATED APPLICATION

This application claims priority to Japanese Patent Application No. 2020-145713, filed on Aug. 31, 2020, the entire contents of which are incorporated herein by reference.

TECHNICAL FIELD

The art disclosed herein relates to a vehicle, and relates in particular to a structure of mounting a bumper and an external fender.

BACKGROUND

Japanese Patent Application Publication No. 2015-147449 describes a structure to mount a rear end of a front bumper to a front fender panel via a retainer.

SUMMARY if a structure to cover a part of a front fender panel with an external fender is adopted, there may be a case where a boundary may be formed between an end of a front bumper and an end of the external fender. There may be a need for reducing a size of a gap between these ends at the boundary.

A vehicle disclosed herein may comprise: a front fender panel; an external fender covering the front fender panel; a bumper mounted on a front side of the vehicle; and a retainer fixing the external fender and the bumper to the front fender panel, wherein the external fender comprises an external fender end extending toward the front side of the vehicle, the bumper comprises a bumper end extending toward a rear side of the vehicle, and the external fender end and the bumper end are disposed in vicinity to each other and face each other, the retainer is disposed near a boundary between the external fender end and the bumper end, the retainer is covered by the external fender and the bumper, the external fender end comprises an external fender flange that protrudes toward inside of the vehicle, the bumper end comprises a bumper flange that protrudes toward the inside of the vehicle, the retainer comprises a groove extending along the boundary between the external fender end and the bumper end, and the external fender flange and the bumper flange are inserted in the groove.

In the vehicle disclosed herein, with its structure in which the external fender flange and the bumper flange are inserted in the groove of the retainer, the external fender end and the bumper end can be directly fixed to each other. Since the retainer can hold positions of the external fender end and the bumper end, a size of a gap between the external fender end and the bumper end can be reduced.

Details and further developments of the art disclosed herein will be described in DETAILED DESCRIPTION below.

DETAILED DESCRIPTION

Figure 1:
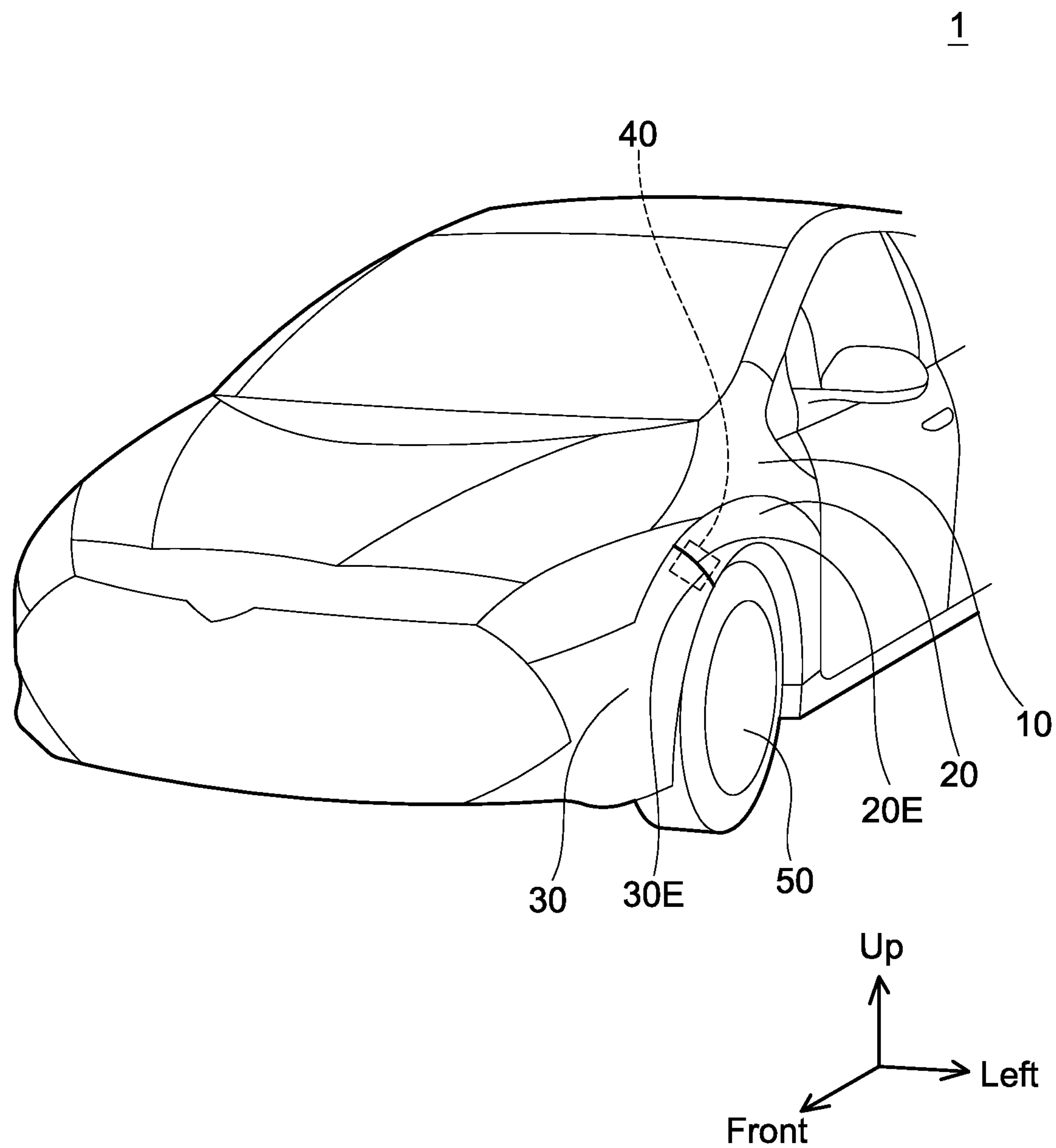
FIG. 1 illustrates a front perspective view of a vehicle 1.

The external fender flange may comprise a first hole. The bumper flange may comprise a second hole. The groove of the retainer may comprise a first pawl and a second pawl. The first pawl may fit into the first hole. The second pawl may fit into the second hole. The fitting between the first pawl and the first hole can hold a position of the external fender in a vehicle width direction, and also fix the external fender to the retainer. Further, the fitting between the second pawl and the second hole can position the bumper in the vehicle width direction, and also fix the bumper to the retainer.

The external fender flange may further comprise a first notch. The bumper flange may further comprise a second notch. The groove of the retainer may comprise a first projection and a second projection. The first projection may engage with the first notch, and the second projection may engage with the second notch. The engagement between the first notch and the first projection can restrict the external fender end from moving along the boundary between the external fender end and the bumper end in a vehicle vertical direction. Further, the engagement between the second notch and the second projection can restrict the bumper end from moving along the boundary between the external fender end and the bumper end in the vehicle vertical direction.

The groove may comprise a wall disposed at a bottom of the groove and extending along a longitudinal direction of the groove. The wall may be located between the external fender flange and the bumper flange. The wall can prevent the external fender flange and the bumper flange from directly interfering with each other.

The groove may include a rear sidewall disposed rearward. The groove may comprise a first rib extending from the rear sidewall of the groove toward the wall. The first rib includes a front-side end extending frontward. The front-side end of the first rib may be in contact with the external fender flange. The first rib can hold the position of the external fender in a vehicle front-rear direction.

The groove may include a front sidewall disposed frontward. The groove may comprise a second rib extending from the front sidewall of the groove toward the wall. The second rib includes a rear-side end extending rearward. The rear-side end of the second rib may be in contact with the bumper flange. The second rib can hold a position of the bumper in the vehicle front-rear direction.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiment (Structure of Vehicle 1)

FIG. 1 illustrates a front perspective view of a vehicle 1. "Front" in a coordinate system of FIG. 1 indicates a frontward direction of the vehicle. "Up" indicates an upward direction of the vehicle. "Left" indicates a leftward direction of the vehicle when the vehicle is seen frontward from rear. The coordinate system is the same throughout the following drawings. Since the vehicle 1 according to the present embodiment has a symmetrical shape in a left-right direction, mainly a left side of the vehicle 1 will hereinafter be described.

The vehicle 1 comprises a front fender panel 10, a resin fender 20, a bumper 30, a retainer 40, and a front wheel 50. The front fender panel 10 is a member arranged on each of front lateral sides of the vehicle 1, and covers its corresponding front wheel 50. The front fender panel 10 is a panel member obtained, for example, by press-forming a metal plate.

The resin fender 20 is a member constituted of resin and covers a part of the front fender panel 10. The resin fender 20 is disposed along a rim of a wheel housing that houses the front wheel 50. The resin fender 20 comprises a resin fender end 20E extending toward a front side of the vehicle 1.

The bumper 30 is a protection member constituted of resin and arranged on a front end portion of the vehicle 1. The bumper 30 is placed over an entire width of the vehicle 1. The bumper 30 comprises a bumper end 30E extending toward a rear side of the vehicle 1. The bumper end 30E is fixed to the front fender panel 10. The resin fender end 20E and the bumper end 30E are in vicinity of each other and face each other.

The retainer 40 is arranged in vicinity of a boundary between the resin fender end 20E and the bumper end 30E. The retainer 40 is indicated in dotted line in FIG. 1 because the retainer 40 is covered by the resin fender 20 and the bumper 30. The retainer 40 is a member for fixing the resin fender end 20E and the bumper end 30E to the front fender panel 10.

(Structure of Retainer 40)

Figure 2:
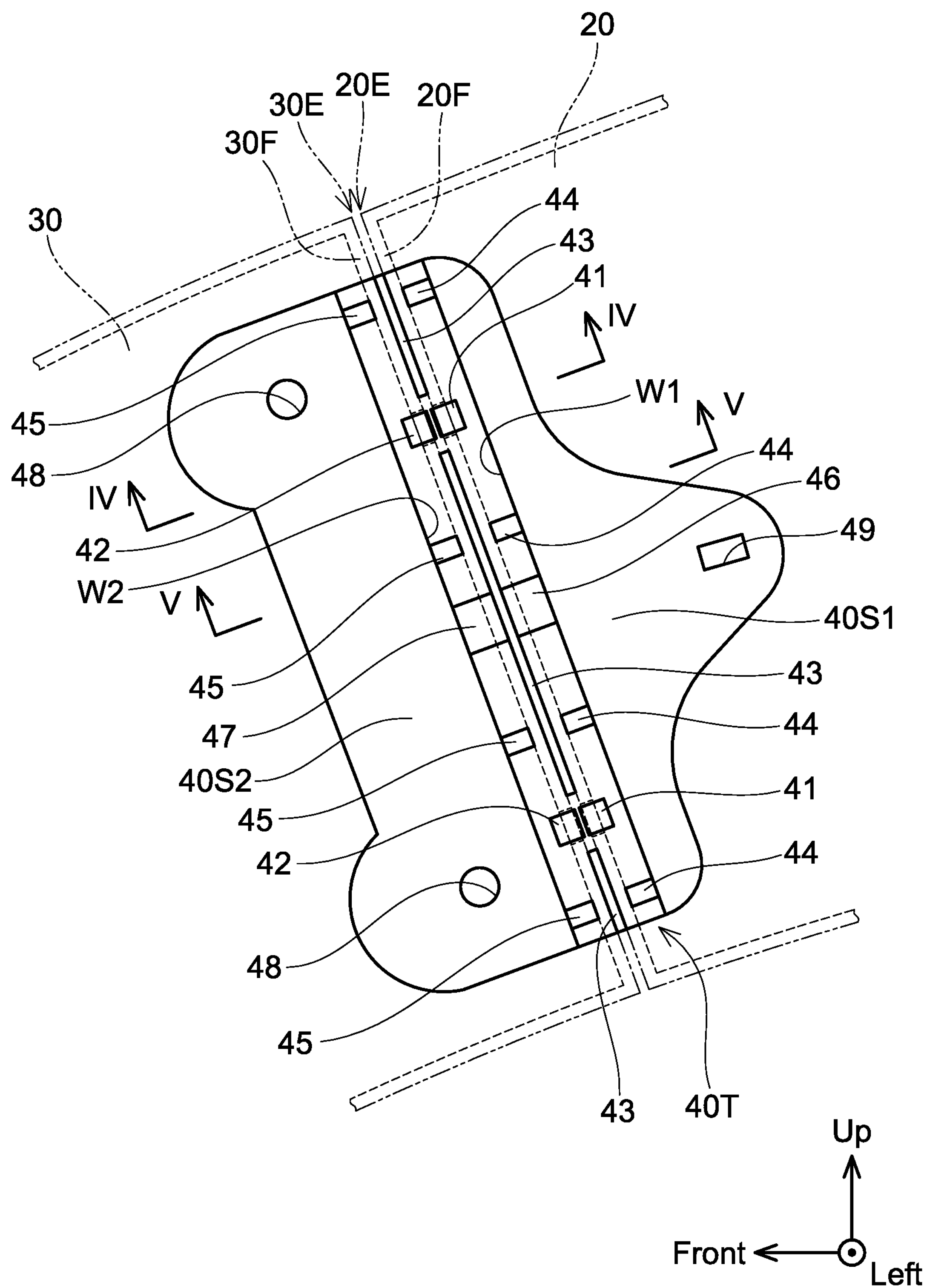
FIG. 2 illustrates an enlarged side view of a vicinity of a retainer 40 (i.e., retainer 40 and its surroundings).
Figure 3:
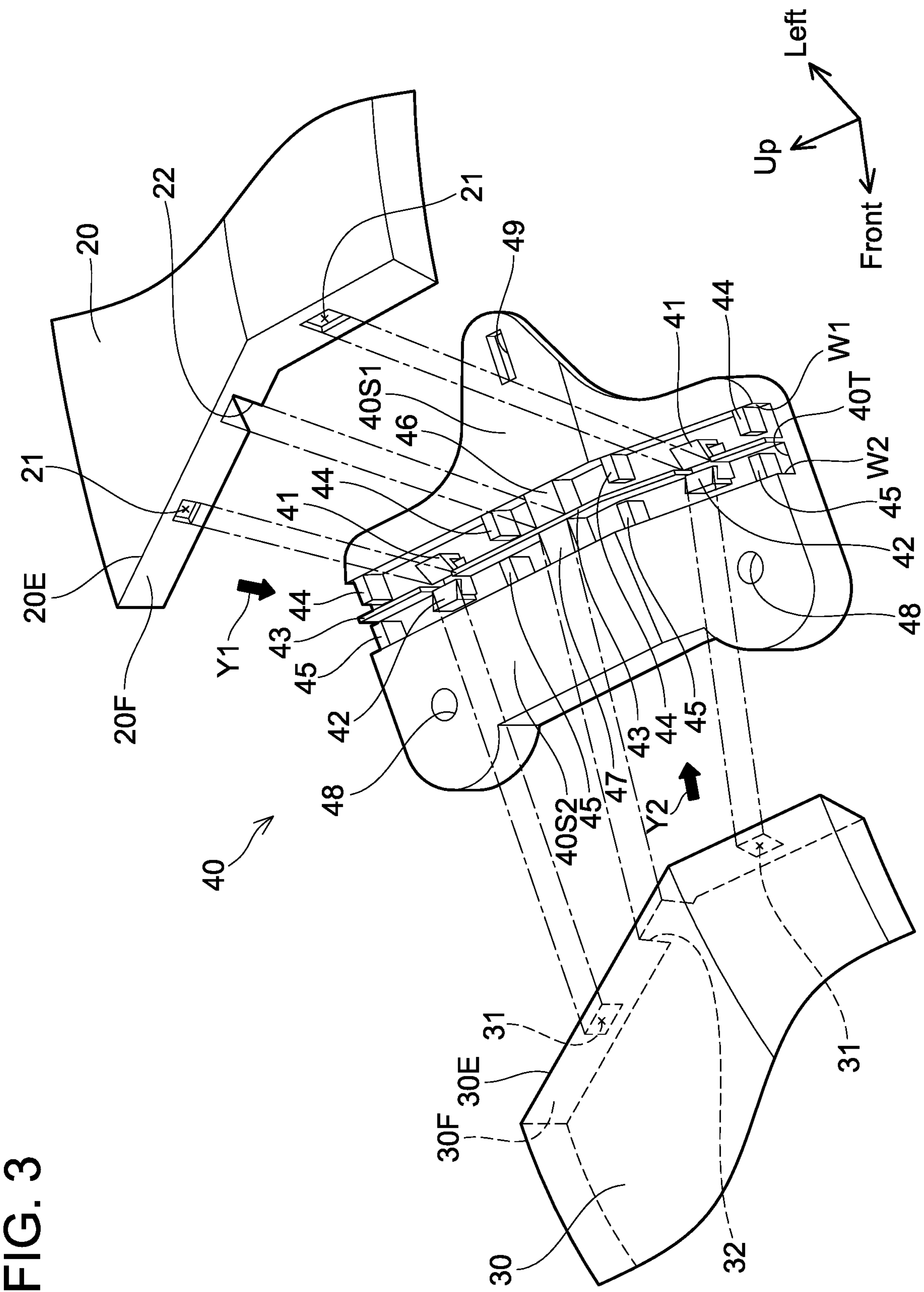
FIG. 3 illustrates an exploded perspective view of a resin fender 20, a bumper 30, and the retainer 40.

FIG. 2 illustrates an enlarged side view of a vicinity of the retainer 40. In FIG. 2, the resin fender 20 and the bumper 30 are indicated in dotted lines. FIG. 3 illustrates an exploded perspective view of the resin fender 20, the bumper 30, and the retainer 40.

The resin fender end 20E comprises a flange 20F protruding inward in a vehicle width direction. The flange 20F comprises holes 21 and a notch 22. The bumper end 30E comprises a flange 30F protruding inward in the vehicle width direction. The flange 30F comprises holes 31 and a notch 32.

The retainer 40 comprises a groove 40T, first fixing pawls 41, second fixing pawls 42, a wall 43, first ribs 44, second ribs 45, a first projection 46, a second projection 47, screw holes 48, and a clip 49. The retainer 40 is a member constituted of resin.

The groove 40T extends along the boundary between the resin fender end 20E and the bumper end 30E. The groove 40T is a part into which the flange 20F and the flange 30F are inserted. The first fixing pawls 41 and the second fixing pawls 42 are parts integrated with the retainer 40. The first fixing pawls 41 and the second fixing pawls 42 are elastically deformable in a vehicle front-rear direction. Each of the first fixing pawls 41 fits into corresponding one of the holes 21 of the resin fender 20. Each of the second fixing pawls 42 fits into corresponding one of the holes 31 of the bumper 30.

The wall 43 is disposed at a bottom of the groove 40T. The wall 43 is perpendicular to the bottom of the groove 40T and extends along a longitudinal direction of the groove 401. The wall 43 is arranged between the flange 20F and the flange 30F.

The groove 40T comprises the plural first ribs 44 and the plural second ribs 45. The plural first ribs 44 and the plural second ribs 45 are reinforcement walls disposed along a direction perpendicular to the direction along which the wall 43 extends. The groove 40T includes a rear sidewall W1 disposed rearward and a front sidewall W2 disposed frontward. Each of the plural first ribs 44 extends from the rear sidewall W1 of the groove 40T toward the wall 43. Each of the plural second ribs 45 extends from the front sidewall W2 of the groove 40T toward the wall 43.

The first projection 46 is a part that engages with the notch 22 of the flange 20F. The engagement between the notch 22 and the first projection 46 can restrict the resin fender end 20E from moving along the boundary between the resin fender end 20E and the bumper end 30E in a vehicle vertical direction (up-down direction in FIGS. 2 and 3).

The second projection 47 is a part that engages with the notch 32 of the flange 30F. The engagement between the notch 32 and the second projection 47 can restrict the bumper end 30E from moving in the vehicle vertical direction.

Each of the screw holes 48 is a part for a screw (not shown) to penetrate therethrough to fix the retainer 40 to the front fender panel 10. The clip 49 is a part which protrudes inward in the vehicle width direction for fixing the retainer 40 to the front fender panel 10.

Figure 4:
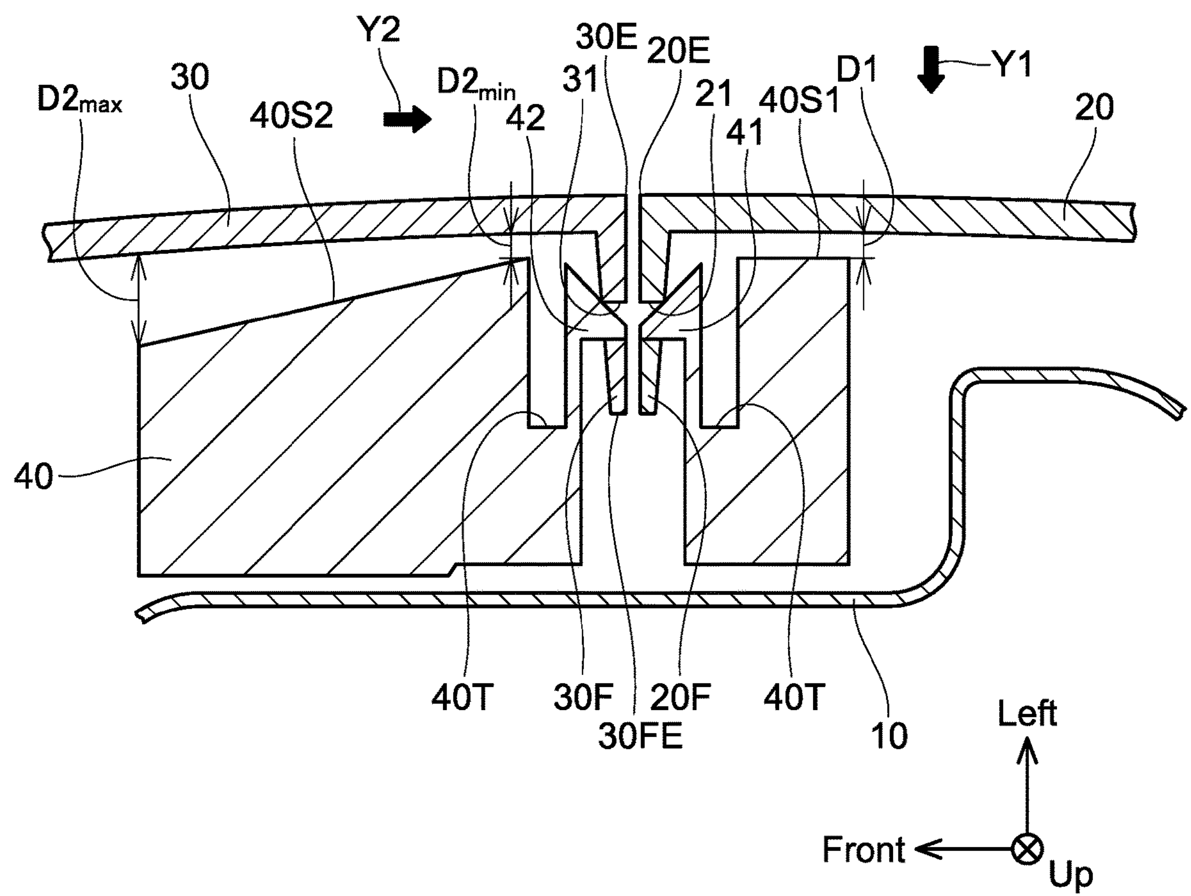
FIG. 4 illustrates a cross-sectional view taken along a IV-IV line in FIG. 2.

FIG. 4 illustrates a cross-sectional view along a IV-IV line in FIG. 2. The IV-IV line is a line running through one of neighboring pairs of the first fixing pawl 41 and the second fixing pawl 42. The first fixing pawl 41 fits into the hole 21 of the flange 20F. The fitting between each pair of the first fixing pawl 41 and the hole 21 can hold a position of the resin fender 20 in the vehicle width direction (up-down direction in FIG. 4) and also fix the resin fender 20 to the retainer 40. Similarly, the second fixing pawl 42 fits into the hole 31 of the flange 30F. The fitting between each pair of the second fixing pawl 42 and the hole 31 can hold a position of the bumper 30 in the vehicle width direction and fix the bumper 30 to the retainer 40.

Figure 5:
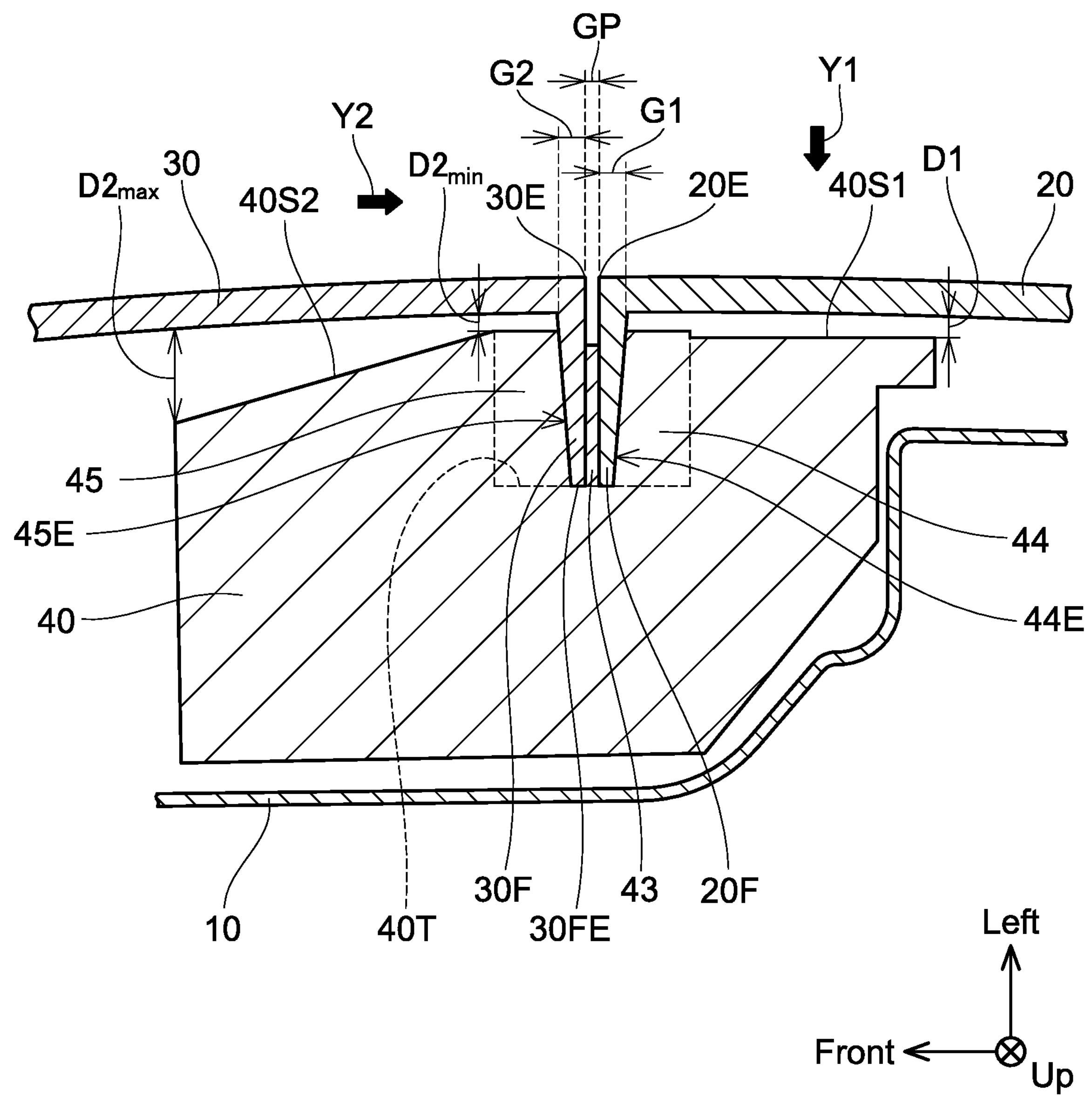
FIG. 5 illustrates a cross-sectional view taken along a V-V line in FIG. 2.

FIG. 5 illustrates a cross-sectional view along a V-V line in FIG. 2. The V-V line is a line running through one of neighboring pairs of the first rib 44 and the second rib 45. The flange 20F is inserted into a gap G1 extending between the first rib 44 and the wall 43. Each first rib 44 includes a front end 44E extending frontward, and the front end 44E of the first rib 44 is in contact with the flange 20F. Due to this, the position of the resin fender 20 in the vehicle front-rear direction (right-left direction in FIG. 5) can be held.

Similarly, the flange 30F is inserted into a gap G2 extending between the second rib 45 and the wall 43. Each second rib 45 includes a rear end 45E extending rearward, and the rear end 45E of the second rib 45 is in contact with the flange 30F. Due to this, the position of the bumper 30 in the vehicle front-rear direction can be held.

The wall 43 is disposed between the flange 20F and the flange 30F. The wall 43 can prevent the flange 20F and the flange 30F from directly interfering with each other.

As shown in FIGS. 4 and 5, the retainer 40 comprises a surface 40S1 disposed rearward of the groove 40T and a surface 40S2 disposed frontward of the groove 40T. A distance D1 between the surface 40S1 and a rear surface of the resin fender 20 is substantially constant. Contrary to this, the surface 40S2 is angled such that a distance between the surface 40S2 and a rear surface of the bumper 30 is at a longest distance D2max at an end of the surface 40S2 disposed frontward and at a shortest distance D2min at an end of the surface 40S2 disposed rearward. In other words, the surface 40S2 is angled such that the surface 40S2 protrudes outward at a greater degree toward a rear side of the surface 40S2.

(Mounting Structure)

A process of mounting the retainer 40, the resin fender 20, and the bumper 30 to the front fender panel 10 will be described. Firstly, the retainer 40 is mounted on the front fender panel 10. Specifically, the clip 49 is inserted into a clip hole (not shown) arranged on the front fender panel 10. Further, the retainer 40 is screwed onto the front fender panel 10 through the screw holes 48.

Secondly, the resin fender 20 is mounted. Specifically, as shown in an arrow Y1 in FIGS. 3 to 5, the resin fender 20 is brought close to the retainer 40 along a direction substantially perpendicular to the surface 40S1 of the retainer 40. The first fixing pawls 41 are made to engage into the holes 21 of the flange 20F. Then, by using a clip or the like (not shown), the resin fender 20 is fixed to the front fender panel 10.

Thirdly, the bumper 30 is mounted. Specifically, as shown by an arrow Y2 in FIGS. 3 to 5, the bumper 30 is moved in parallel from the vehicle front side to the vehicle rear side. At this occasion, a tip 30FE of the flange 30F on a vehicle inner side moves in the arrow Y2 direction while sliding on the surface 40S2. Due to this, the bumper 30 can be brought close to the retainer 40. while allowing the bumper end 30E to be elastically deforming such that the bumper end 30E extends outward in the vehicle width direction. Once the flange 30F has reached the groove 40T, the flange 30F is engaged with the groove 40T by self-alignment by elastic force exerted by the bumper 30 returning to its original shape. That is, the surface 40S2 functions as a guide surface for inserting the flange 30F into the groove 40T. Due to this, the bumper 30 can be smoothly incorporated.

For example, if the bumper 30 is assembled with the retainer 40 along the substantially-perpendicular direction (arrow Y1 direction), there may be a risk where the bumper 30 will come into contact with the resin fender end 20E of the resin fender 20 that has already been mounted, as a result of which the resin fender end 20E may be scratched. According to the art disclosed herein, the bumper 30 can be mounted from the front of the vehicle (arrow Y2 direction), by using the surface 40S2 as a guide surface. Thus, the resin fender end 20E can be prevented from touching the bumper end 30E.

The surface 40S1 does not need to function as a guide surface, and therefore the surface 40S1 and the rear surface of the resin fender 20 can be made substantially parallel to each other. Thus, the surface 40S1 can be allowed to function as a reinforcement for the resin fender 20. Panel rigidity of the resin fender 20 can be ensured.

(Effects)

As a comparative example, a case where the resin fender end 20E is not held by a retainer will be considered. In this case, a position of the resin fender end 20E is determined indirectly by a clip for example (not shown) which retains the resin fender 20 at a position other than the resin fender end 20E. In the art disclosed herein, the retainer 40 is used to fix the resin fender end 20E and the bumper end 30E. Positions of the resin fender end 20E and the bumper end 30E can be determined directly by the retainer 40. Compared to the comparative example, accuracy of holding the positions of the resin fender end 20E and the bumper end 30E can be enhanced. As a result of this, the gap GP between the resin fender end 20E and the bumper end 30E (see FIG. 5) can be made small.

There may be a case where a retainer is used to fix a rear end of a bumper to a front fender panel. In the art disclosed herein, the retainer for fixing the end of the bumper mentioned here can also be used to serve as a retainer for fixing an end of an external fender. Additional component is not necessary, and thus cost increase can be suppressed.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

(Variant)

Although how the front part of the vehicle 1 is structured was described, this structure is not limiting. The art disclosed herein may be applied to an external lender that covers a rear fender and a rear bumper.

A material of the external fender is not limited to resin. Various materials such as carbon fiber, fiberglass, and composite thereof may be used as the material.

The resin fender 20 is an example for an external fender. The resin fender end 20E is an example of an external fender end. The flange 20F is an example of an external fender flange. The holes 21 are examples of a first hole. The holes 31 are examples of a second hole. The first fixing pawls 41 are examples of a first pawl. The second fixing pawls 42 are examples of a second pawl. The notch 22 is an example of a first notch. The notch 32 is an example of a second notch.

What is claimed is:

1. A vehicle comprising:

a front fender panel;

an external fender covering the front fender panel;

a bumper mounted on a front side of the vehicle; and a retainer fixing the external fender and the bumper to the front fender panel, wherein the external fender comprises an external fender end extending toward the front side of the vehicle, the bumper comprises a bumper end extending toward a rear side of the vehicle, and the external fender end and the bumper end are disposed in vicinity to each other and face each other,
the retainer is disposed near a boundary between the external fender end and the bumper end,
the retainer is covered by the external fender and the bumper,
the external fender end comprises an external fender flange that protrudes toward inside of the vehicle,
the bumper end comprises a bumper flange that protrudes toward the inside of the vehicle,
the retainer comprises a groove extending along the boundary between the external fender end and the bumper end,
the external fender flange and the bumper flange are inserted in the groove,
the external fender flange comprises a first hole,
the bumper flange comprises a second hole,
the groove of the retainer comprises a first pawl and a second pawl,
the first pawl fits into the first hole, and
the second pawl fits into the second hole.

2. The vehicle according to claim 1, wherein
the external fender flange further comprises a first notch,
the bumper flange further comprises a second notch,
the groove of the retainer comprises a first projection and a second projection,
the first projection engages with the first notch, and
the second projection engages with the second notch.

3. The vehicle according to claim 1, wherein
the groove comprises a wall disposed at a bottom of the groove and extending along a longitudinal direction of the groove, and
the wall is located between the external fender flange and the bumper flange.

4. The vehicle according to claim 3, wherein
the groove includes a rear sidewall disposed rearward,
the groove comprises a first rib extending from the rear sidewall of the groove toward the wall,
the first rib includes a front-side end extending frontward, and
the front-side end of the first rib is in contact with the external fender flange.

5. The vehicle according to claim 3, wherein
the groove includes a front sidewall disposed frontward,
the groove comprises a second rib extending from the front sidewall of the groove toward the wall,
the second rib includes a rear-side end extending rearward, and
the rear-side end of the second rib is in contact with the bumper flange.

6. A vehicle comprising:
a front fender panel;
an external fender covering the front fender panel;
a bumper mounted on a front side of the vehicle; and
a retainer fixing the external fender and the bumper to the front fender panel, wherein
the external fender comprises an external fender end extending toward the front side of the vehicle, the bumper comprises a bumper end extending toward a rear side of the vehicle, and the external fender end and the bumper end are disposed in vicinity to each other and face each other,
the retainer is disposed near a boundary between the external fender end and the bumper end,
the retainer is covered by the external fender and the bumper,
the external fender end comprises an external fender flange that protrudes toward inside of the vehicle,
the bumper end comprises a bumper flange that protrudes toward the inside of the vehicle,
the retainer comprises a groove extending along the boundary between the external fender end and the bumper end,
the external fender flange and the bumper flange are inserted in the groove,
the external fender flange further comprises a first notch,
the bumper flange further comprises a second notch,
the groove of the retainer comprises a first projection and a second projection,
the first projection engages with the first notch, and
the second projection engages with the second notch.

7. The vehicle according to claim 6, wherein
the groove comprises a wall disposed at a bottom of the groove and extending along a longitudinal direction of the groove, and
the wall is located between the external fender flange and the bumper flange.

8. The vehicle according to claim 7, wherein
the groove includes a rear sidewall disposed rearward,
the groove comprises a first rib extending from the rear sidewall of the groove toward the wall,
the first rib includes a front-side end extending frontward, and
the front-side end of the first rib is in contact with the external fender flange.

9. The vehicle according to claim 7, wherein
the groove includes a front sidewall disposed frontward,
the groove comprises a second rib extending from the front sidewall of the groove toward the wall,
the second rib includes a rear-side end extending rearward, and
the rear-side end of the second rib is in contact with the bumper flange.

10. A vehicle comprising:
a front fender panel;
an external fender covering the front fender panel;
a bumper mounted on a front side of the vehicle; and
a retainer fixing the external fender and the bumper to the front fender panel, wherein
the external fender comprises an external fender end extending toward the front side of the vehicle, the bumper comprises a bumper end extending toward a rear side of the vehicle, and the external fender end and the bumper end are disposed in vicinity to each other and face each other,
the retainer is disposed near a boundary between the external fender end and the bumper end,
the retainer is covered by the external fender and the bumper,
the external fender end comprises an external fender flange that protrudes toward inside of the vehicle,
the bumper end comprises a bumper flange that protrudes toward the inside of the vehicle,
the retainer comprises a groove extending along the boundary between the external fender end and the bumper end,
the external fender flange and the bumper flange are inserted in the groove,
the groove comprises a wall disposed at a bottom of the groove and extending along a longitudinal direction of the groove, and
the wall is located between the external fender flange and the bumper flange.

11. The vehicle according to claim 10, wherein the groove includes a rear sidewall disposed rearward, the groove comprises a first rib extending from the rear sidewall of the groove toward the wall, the first rib includes a front-side end extending frontward, and the front-side end of the first rib is in contact with the external fender flange.

12. The vehicle according to claim 10, wherein the groove includes a front sidewall disposed frontward, the groove comprises a second rib extending from the front sidewall of the groove toward the wall, the second rib includes a rear-side end extending rearward, and the rear-side end of the second rib is in contact with the bumper flange.

* * * * *